US009202313B2

(12) United States Patent
Bennet et al.

(10) Patent No.: US 9,202,313 B2
(45) Date of Patent: Dec. 1, 2015

(54) VIRTUAL INTERACTION WITH IMAGE PROJECTION

(71) Applicants: Rotem Bennet, Ein Karmel (IL); Avner Aharoni, Seattle, WA (US)

(72) Inventors: Rotem Bennet, Ein Karmel (IL); Avner Aharoni, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 144 days.

(21) Appl. No.: 13/746,226

(22) Filed: Jan. 21, 2013

(65) Prior Publication Data

US 2014/0204002 A1 Jul. 24, 2014

(51) Int. Cl.
*G09G 5/00* (2006.01)
*G06T 19/00* (2011.01)
*G06F 3/01* (2006.01)
*G06F 3/03* (2006.01)
*G06F 3/0481* (2013.01)
*G06F 3/0484* (2013.01)

(52) U.S. Cl.
CPC .............. *G06T 19/006* (2013.01); *G06F 3/011* (2013.01); *G06F 3/017* (2013.01); *G06F 3/0304* (2013.01); *G06F 3/04815* (2013.01); *G06F 3/04842* (2013.01)

(58) Field of Classification Search
CPC ......... G06T 19/00; G06F 3/011; G06F 3/017; G06F 3/0304; G06F 3/04815; G06F 3/04842; G02B 27/017; G02B 27/0172
USPC .......................................................... 345/8
See application file for complete search history.

(56) References Cited

U.S. PATENT DOCUMENTS

| 5,767,842 | A | 6/1998 | Korth |
| 5,912,658 | A | 6/1999 | Bergamasco et al. |
| 2008/0297535 | A1 | 12/2008 | Reinig |

(Continued)

FOREIGN PATENT DOCUMENTS

| WO | 0207839 A2 | 1/2002 |
| WO | 2010120304 A2 | 10/2010 |

OTHER PUBLICATIONS

Keetels, M. et al., "Exposure to Delayed Visual Feedback of the Hand Changes Motor-Sensory Synchrony Perception," Experimental Brain Research, vol. 219, Issue 4, pp. 431-440, Jun. 2012, 10 pages.

(Continued)

*Primary Examiner* — Towfiq Elahi
(74) *Attorney, Agent, or Firm* — Dan Choi; Judy Yee; Micky Minhas

(57) ABSTRACT

Embodiments that relate to providing a low-latency interaction in a virtual environment are provided. In one embodiment an initial image of a hand and initial depth information representing an initial actual position are received. The initial image is projected into the virtual environment to an initial virtual position. A segmented version of the initial image is provided for display in the virtual environment at the initial virtual position. A subsequent image of the hand and depth information representing a subsequent actual position are received. The subsequent image is projected into the virtual environment to a subsequent virtual position. A segmented version of the subsequent image is provided for display at the subsequent virtual position. A collision is detected between a three-dimensional representation of the hand and a virtual or physical object.

16 Claims, 9 Drawing Sheets

(56) References Cited

U.S. PATENT DOCUMENTS

| | | |
|---|---|---|
| 2010/0177035 A1 | 7/2010 | Schowengerdt et al. |
| 2010/0306716 A1* | 12/2010 | Perez .......................... 715/863 |
| 2012/0227006 A1* | 9/2012 | Amm .......................... 715/773 |
| 2013/0335303 A1* | 12/2013 | Maciocci et al. ................ 345/8 |

OTHER PUBLICATIONS

"Apple Patent Application Details Method for Detecting and Displaying Hand Position on Screen," Sarah Silbert, Engadget, http://www.engadget.com/2012/09/06/apple-patent-method-detect-display-hand-position/, Sep. 6, 2012, 10 pages.

Teather, R. et al., "Exaggerated Head Motions for Game Viewpoint Control," FuturePlay 2008, Nov. 2008, 4 pages.

Silbert, Sarah., "Apple patent application details method for detecting and displaying hand position on screen", Retrieved at <<http://www.engadget.com/2012/09/06/apple-patent-method-detect-display-hand-position/>>, Sep. 6, 2012, pp. 7.

Rodrigues, et al., "A Virtual Touch Interaction Device for Immersive Applications—", Retrieved at <<http://www.tecgraf.puc-rio.br/~abraposo/pubs/IJVR/vGlove_IJVR2011.pdf>>, The International Journal of Virtual Reality, 2011, pp. 10.

Werkhoven, et al., "Interactive Virtual Environments Adaptation to virtual hand position—", Retrieved at <<http://www.dtic.mil/cgi-bin/GetTRDoc?AD=ADA326392>>, Technical Report, Human Factors Research Inst Tno Soesterberg, Netherlands, Apr. 16, 1997, pp. 39.

Malik, Shahzad., "An Exploration of Multi-Finger Interaction on Multi-Touch Surfaces—", Retrieved at <<http://www.cs.utoronto.ca/~smalik/downloads/malik_2007_thesis_multi_finger_final.pdf>>, Doctoral dissertation, University of Toronto, Sep. 6, 2012, pp. 184.

European Patent Office, International Search Report & Written Opinion for PCT Patent Application No. PCT/US2014/011559, May 26, 2014, 12 Pages.

"Image Segmentation", Wikipedia, Dec. 26, 2012, Available at: http://en.wikipedia.org/w/index.php?title=Image_segmentation&oldid=529803636.

IPEA European Patent Office, International Preliminary Report on Patentability Issued in Application No. PCT/US2014/011559, Mar. 24, 2015, 6 Pages.

* cited by examiner

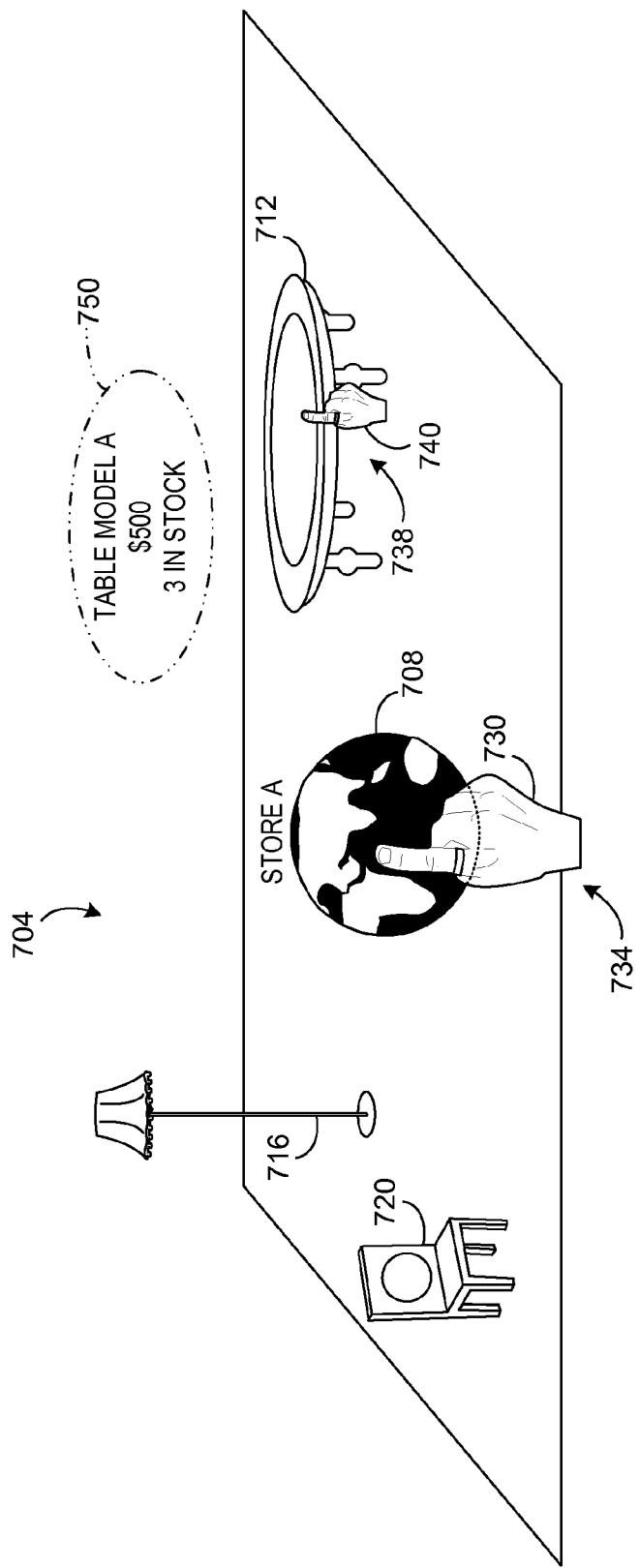

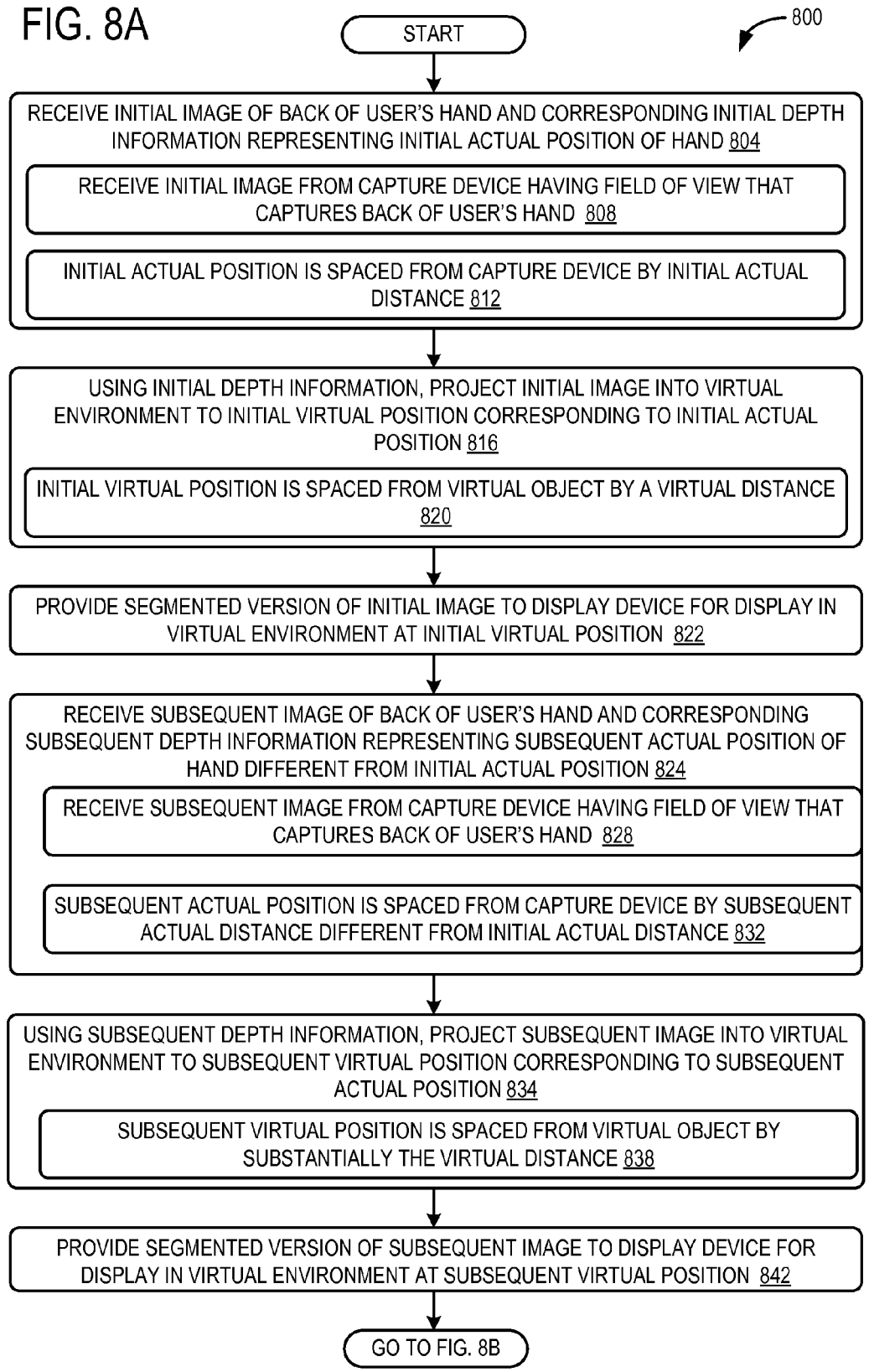

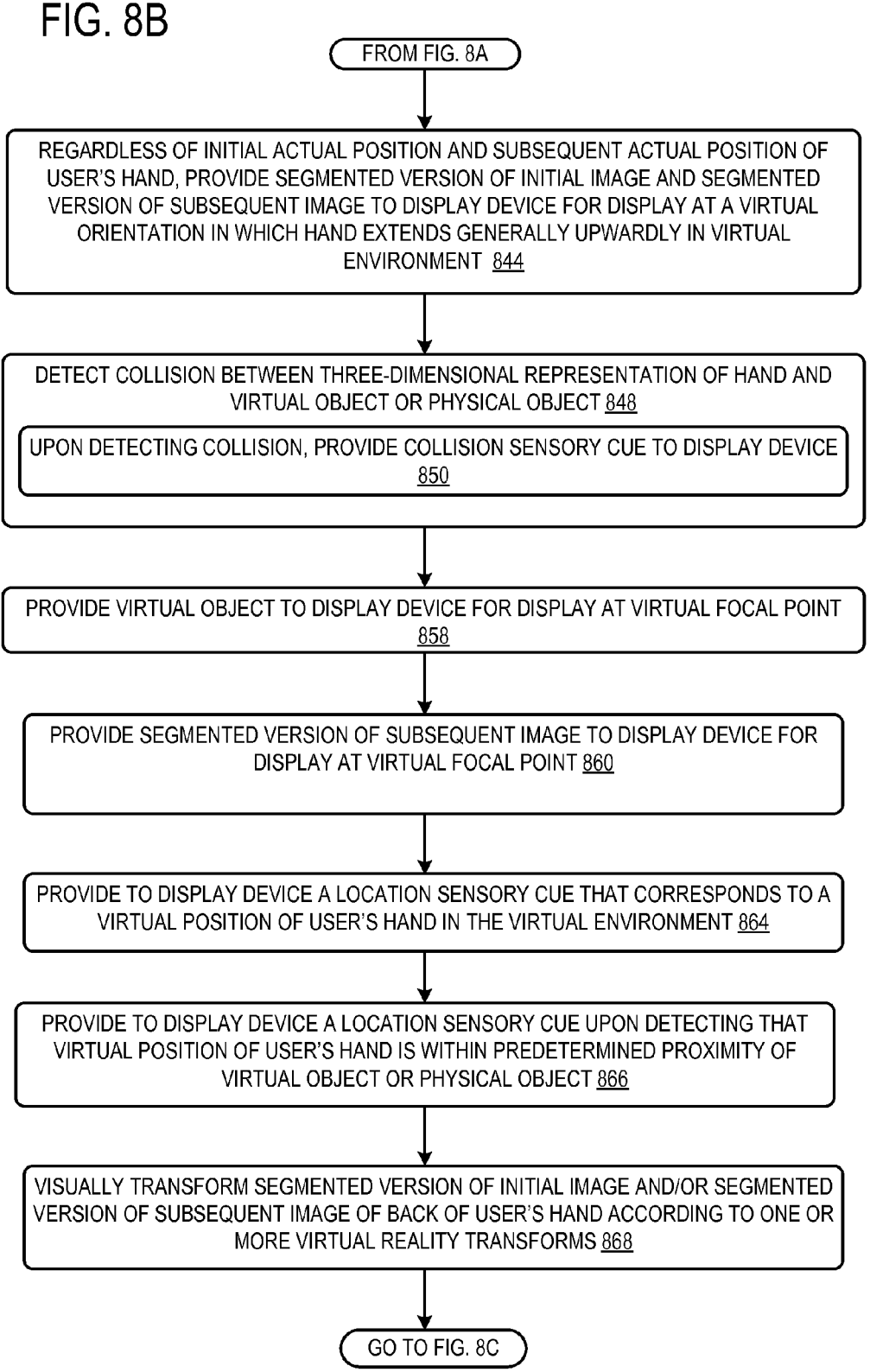

VIRTUAL INTERACTION WITH IMAGE PROJECTION

BACKGROUND

In some virtual reality and mixed reality display systems, it may be desirable to simulate immersive, touch-like interactions in the virtual environment. For example, a user may desire to manipulate a virtual object with her hand's motion in a manner similar to how she would handle such an object in the physical world. However, enabling such an immersive and natural touch-like interaction has proven challenging.

Previous attempts to enable interactions with a virtual object include using a symbolic or rendered representation of the user's hand. Such approaches, however, typically utilize precise hand tracking which may add significant latency to the experience. Additionally, in such direct physical-virtual interactions the interacting hand is viewed "directly" by the user, such as via a transparent head-mounted display/virtual reality system. Such systems typically include significant virtual display latency, since the time of the user's direct viewing of the hand corresponds to the virtual system's processing just beginning. Accordingly, in these systems the display frame-rate (e.g., frames-per-second) is an unavoidable lower-bound for the experienced interaction latency. Viewing a symbolic or rendered representation of a user's hand also creates a less than intuitive and natural experience. Gesture recognition systems also typically utilize precise hand and finger tracking, and are restricted to a symbolic gesture "language" which the user is forced to learn.

Capturing and using a silhouette of the user's hand generally involves a user raising his hand toward a capture device and display screen, and performing movements in this raised position. In these systems the camera position (e.g. frontal sensor) can usually capture only the inner-palm when the hand is raised upwards (towards the sensor). Such a position may be tiresome and uncomfortable over longer periods. Further, the user's hand may obscure the user's view of the object being manipulated. Additionally, the captured image of the inner side of the user's palm is typically presented as a colored silhouette or shadow of the opposite, outer side of the user's hand. Such a manipulated representation of the hand also creates a perception of a less than intuitive and indirect interaction experience.

Another disadvantage of this kind of inner-palm silhouette presentation occurs when the hand changes distance from the sensor (e.g. the hand moves closer to virtual objects and farther from the user, when reaching towards the display/sensor). In this situation, the size of the silhouette changes accordingly (e.g. becomes larger due to moving closer to sensor). However, to the user such change is counterintuitive as to how the silhouette would naturally change in order to realistically emulate the silhouette of the outer-palm (e.g. it would become smaller as it moves further from the person). In this manner, such silhouette-based systems provide less than realistic hand-image presentations.

SUMMARY

Various embodiments are disclosed herein that relate to providing a low-latency interaction in a virtual environment. For example, one disclosed embodiment provides a method that includes receiving an initial image of a back of a user's hand and corresponding initial depth information that represents an initial actual position of the hand. Using the initial depth information, the initial image is projected into a virtual environment to an initial virtual position, with the initial virtual position corresponding to the initial actual position. A segmented version of the initial image is provided to a display device for display in the virtual environment at the initial virtual position.

The method includes receiving a subsequent image of the back of the user's hand and corresponding subsequent depth information that represents a subsequent actual position of the hand that is different from the initial actual position. Using the subsequent depth information, the subsequent image is projected into the virtual environment to a subsequent virtual position, with the subsequent virtual position corresponding to the subsequent actual position. A segmented version of the subsequent image is provided to the display device for display in the virtual environment at the subsequent virtual position. The method then includes detecting a collision between a three-dimensional representation of the hand and a virtual object in the virtual environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a schematic view of a virtual environment in the form of a mixed reality environment as viewed via a display device.

FIGS. 8A, 8B and 8C are a flow chart of a method for providing a low-latency interaction in a virtual environment according to an embodiment of the present disclosure.

DETAILED DESCRIPTION

Figure 1:
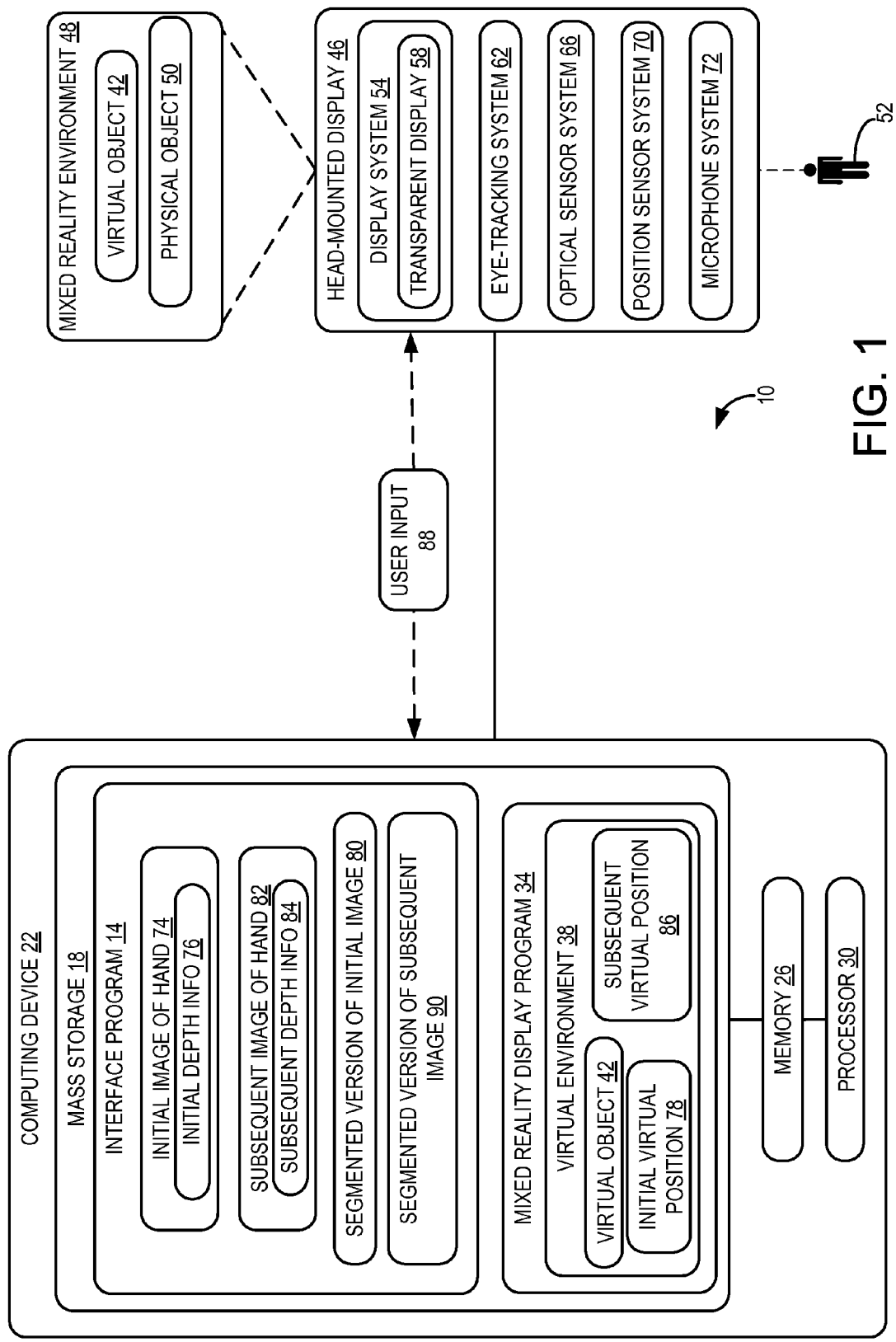
FIG. 1 is a schematic view of an interface system and display device according to an embodiment of the present disclosure.

FIG. 1 shows a schematic view of one embodiment of an interface system 10. The interface system 10 includes an interface program 14 that may be stored in mass storage 18 of a computing device 22. The interface program 14 may be loaded into memory 26 and executed by a processor 30 of the computing device 22 to perform one or more of the methods and processes described in more detail below.

A mixed reality display program 34 may generate a virtual environment 38 including at least one virtual object 42. Such virtual environment 38 may be provided to a display device, such as the head-mounted display (HMD) device 46. As explained in more detail below, the HMD device 46 may create a virtual environment in the form of a mixed reality environment 48 that includes one or more virtual objects 42 and physical objects 50 that are viewable by a user 52 via the HMD device. Alternatively expressed, the mixed reality environment 48 may comprise the virtual environment 38 and a physical environment that are both viewable by the user 52 via the HMD device. As explained in more detail below, in some examples the mixed reality environment 48 may comprise a virtual environment 38 in which no virtual objects are viewable by the user 52, and in which one or more physical objects 50 along with a three-dimensional representation of a user's hand are viewable by the user.

It will also be appreciated that many other types and configurations of display devices utilizing various display technologies and having various form factors may also be used within the scope of the present disclosure. Such display devices may include, but are not limited to, fixed-position monitors, mobile devices such as smart phones, tablet computers, and notebook computers, projection display devices, two-dimensional displays, three-dimensional (3D) displays, and other suitable types of display devices.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 9.

The computing device 22 may be operatively connected with the HMD device 46 using a wired connection, or may employ a wireless connection via WiFi, Bluetooth, or any other suitable wireless communication protocol. Additionally, the example illustrated in FIG. 1 shows the computing device 22 as a separate component from the HMD device 46. It will be appreciated that in other examples the computing device 22 may be integrated into the HMD device 46.

Figure 2:
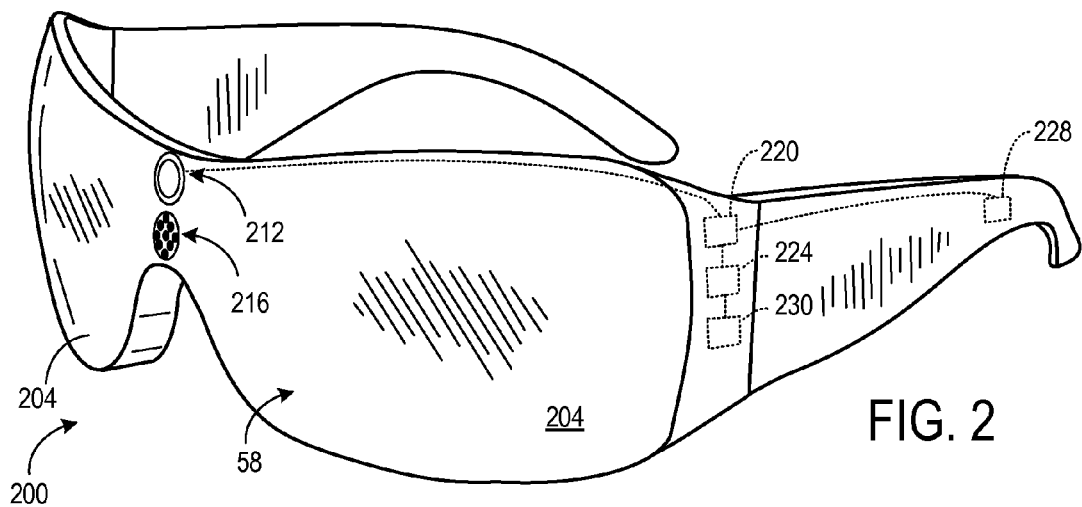
FIG. 2 shows an example head-mounted display device according to an embodiment of the present disclosure.

With reference now also to FIG. 2, one example of an HMD device in the form of a pair of wearable glasses 200 with a transparent display 58 is provided. It will be appreciated that in other examples, the HMD device 46 may take other suitable forms in which a transparent, semi-transparent or non-transparent display is supported in front of a viewer's eye or eyes. It will also be appreciated that the HMD device 46 shown in FIG. 1 may take the form of the HMD device 200, as described in more detail below, or any other suitable HMD device.

With reference to FIGS. 1 and 2, in this example the HMD device 46 includes a display system 54 and transparent display 58 that enables images to be delivered to the eyes of a user. The transparent display 58 may be configured to visually augment an appearance of a physical environment to a user viewing the physical environment through the transparent display. For example, the appearance of the physical environment may be augmented by graphical content (e.g., one or more pixels each having a respective color and brightness) that is presented via the transparent display 58 to create a mixed reality environment 48.

The transparent display 56 may also be configured to enable a user to view a physical, real-world object in the physical environment through one or more partially transparent pixels that are displaying a virtual object representation. In one example, the transparent display 58 may include image-producing elements located within lenses 204 (such as, for example, a see-through Organic Light-Emitting Diode (OLED) display). As another example, the transparent display 58 may include a light modulator on an edge of the lenses 204. In this example the lenses 204 may serve as a light guide for delivering light from the light modulator to the eyes of a user. Such a light guide may enable a user to perceive a 3D holographic image located within the physical environment that the user is viewing, while also allowing the user to view physical objects in the physical environment.

The HMD device 46 may also include various sensors and related systems. For example, the HMD device 46 may include an eye-tracking sensor system 62 that utilizes at least one inward facing sensor 216. The inward facing sensor 216 may be an image sensor that is configured to acquire image data in the form of eye-tracking information from a user's eyes. Provided the user has consented to the acquisition and use of this information, the eye-tracking sensor system 62 may use this information to track a position and/or movement of the user's eyes.

In one example, the eye-tracking system 62 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the eye-tracking sensor system 62 may then determine a direction and/or at what physical object or virtual object the user is gazing. Such gaze detection data may then be provided to the interface program 14. It will be understood that the gaze detection subsystem may have any suitable number and arrangement of light sources and image sensors.

The HMD device 46 may also include sensor systems that receive physical environment data from the physical environment. For example, the HMD device 46 may include an optical sensor system 66 that utilizes at least one outward facing sensor 212, such as an optical sensor. Outward facing sensor 212 may capture images and depth information from objects within its field of view. In some examples, outward facing sensor 212 may include a depth camera, a visible light camera such as an RGB camera, an infrared light camera, and/or a position tracking camera. In one example and as described in more detail below, the outward facing sensor 212 may include a field of view enabling the sensor to capture images and depth information from a user's hands when extended outwardly from the user's torso.

In one example, one or more depth cameras may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may also capture images of physical environment in which a user is situated. In one example, the mixed reality display program 34 may include a 3D modeling system that uses such images and depth information to generate virtual environment 38 that models the physical environment data that is captured.

The HMD device 46 may also include a position sensor system 70 that utilizes one or more motion sensors 224 to enable position tracking and/or orientation sensing of the HMD device. For example, the position sensor system 70 may be utilized to determine a head pose orientation of a user's head. In one example, position sensor system 62 may comprise an inertial measurement unit configured as a six-axis or six-degree of freedom position sensor system. This example position sensor system may, for example, include three accelerometers and three gyroscopes to indicate or measure a change in location of the HMD device 46 within three-dimensional space along three orthogonal axes (e.g., x, y, z), and a change in an orientation of the HMD device about the three orthogonal axes (e.g., roll, pitch, yaw).

Position sensor system 70 may also support other suitable positioning techniques, such as GPS or other global navigation systems. Further, while specific examples of position sensor systems have been described, it will be appreciated that other suitable position sensor systems may be used.

In some examples, motion sensors 224 may also be employed as user input devices, such that a user may interact with the HMD device 46 via gestures of the neck and head, or even of the body. The HMD device 46 may also include a microphone system 72 that includes one or more microphones 220. In other examples, audio may be presented to the user via one or more speakers 228 on the HMD device 46.

The HMD device 46 may also include a processor 230 having a logic subsystem and a storage subsystem, as discussed in more detail below with respect to FIG. 9, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 58.

It will be appreciated that the HMD device 46 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 46 may include additional and/or alternative sensors, cameras, microphones, input devices, output devices, etc. without departing from the scope of this disclosure. Further, the physical configuration of the HMD device 46 and its various sensors and subcomponents may take a variety of different forms without departing from the scope of this disclosure.

Figure 3:
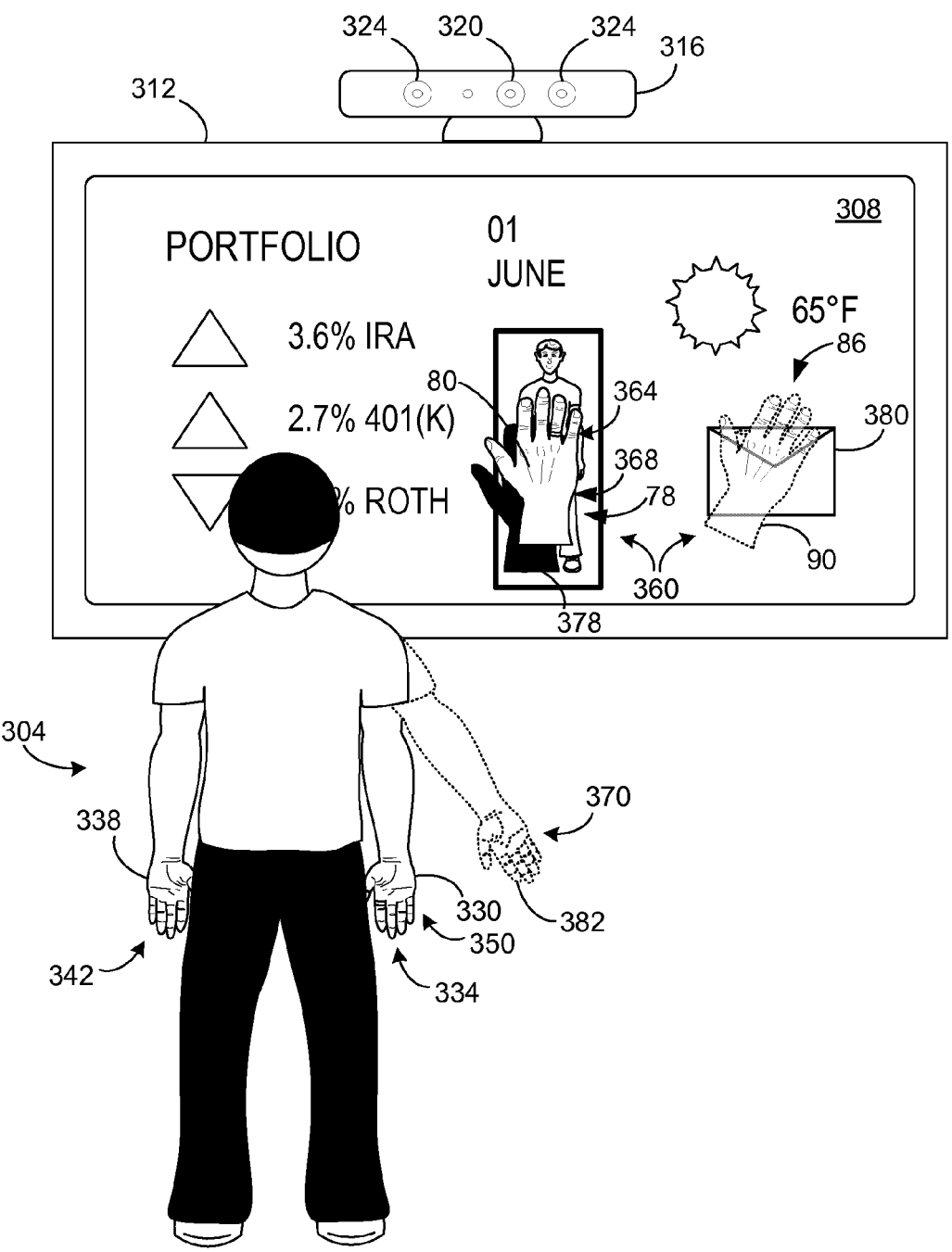
FIG. 3 is a schematic view of a user interacting with an example virtual environment displayed on a display device via the interface system according to an embodiment of the present disclosure.

With reference now to FIGS. 3-7, descriptions of example use cases and embodiments of the interface system 10 will now be provided. FIG. 3 is a schematic illustration of one example of a user 304 interacting with a virtual environment in the form of an operating system home screen 308. The home screen 308 is displayed on a flat panel display device 312 mounting on a wall and spaced from the user 304. An image capture device 316 mounted on the display device 312 includes an RGB camera 320 and a depth sensing camera 324 facing the user 304. Both the RGB camera 320 and depth sensing camera 324 have a field of view that captures the user 304 including the back 330 of the user's right hand 334 and the back 338 of the user's left hand 342

As shown in FIG. 3, the user is standing with his arms resting comfortably at his side. In this posture the back 330 of the user's right hand 334 and the back 338 of the user's left hand 342 generally face the image capture device 316. As explained in more detail below, and with reference also to FIG. 1, the interface program 14 receives an initial image 74 of the back 330 of the user's right hand 334 that is captured with the RGB camera 320. Initial depth information 76 corresponding to the initial image 74 is also received. Together the initial RGB image 74 and initial depth information 76 represent an initial actual position 350 of the user's right hand 334.

Using the initial depth information 76 the interface program 14 projects the initial image 74 into the virtual environment 38 to an initial virtual position 78, with the initial virtual position corresponding to the initial actual position 350 of the user's right hand 334. Next, the interface program 14 generates a segmented version 80 of the initial image 74, and provides the segmented version to the display device 312 for display in the operating system home screen 308 at the initial virtual position 78.

It will be appreciated that the segmented version 80 of the initial image 74 may be generated by partitioning the image into multiple segments comprising sets of pixels, thereby simplifying the representation of the image. Any suitable image segmentation technique may be utilized to generate the segmented version 80. Such image segmentation techniques include, but are not limited to, compression-based, histogram-based, model-based, thresholding, and clustering techniques.

It will be appreciated that the segmented version 80 of the initial RGB image 74 provides a realistic image of the user's actual right hand 334. Such a realistic image contrasts with rendered and other computer-generated representations of objects which may be less realistic and/or computationally expensive to produce comparable realism. Advantageously, this realistic, segmented version 80 of the initial RGB image 74 of the user's actual hand, in combination with authentically displayed movement of the hand image, as described in more detail below, creates a user perception of the hand image as a natural body extension that embodies sensory-motor patterns that are quickly learned by the user.

As shown in FIG. 3, the segmented version 80 of the user's right hand 334 is provided to the display device 312 for display at a virtual orientation 360 in which the hand extends generally upwardly in the home screen 308. Advantageously, and as explained in more detail below, regardless of the position of the user's actual right hand 334, the interface program 14 is configured to provide a segmented version of the image of the back of the hand to the display device 312 for display at a virtual orientation 360 in which the hand extends generally upwardly in the home screen 308 as viewed by the user 304. For purposes of this disclosure, "generally upwardly" means a direction in which the knuckles 364 of the hand are above the wrist 368 as viewed in a virtual environment 38 such as the home screen 308.

The user 304 may move his right hand 334 to a subsequent actual position away from the user's body, indicated at 370, generally keeping the back 330 of the hand facing the capture device 316. It will be appreciated that such movement may involve a natural, low-effort motion of pivoting the user's arm from the user's shoulder. The interface program 14 receives a subsequent image 82 of the back 330 of the user's right hand 334 that is captured with the RGB camera 320. Subsequent depth information 84 corresponding to the subsequent image 82 is also received. Together the subsequent image 82 and subsequent depth information 84 represent the subsequent actual position 370 of the user's right hand 334.

Using the subsequent depth information 84 the interface program 14 projects the subsequent image 82 into the virtual environment 38 to a subsequent virtual position 86, with the subsequent virtual position corresponding to the subsequent actual position 370 of the user's right hand 334. Next, the interface program 14 generates a segmented version 90 of the subsequent image 82, and provides the segmented version to the display device 312 for display in the operating system home screen 308 at a subsequent virtual position 86.

It will be appreciated that the movement of the user's right hand 334 between the initial actual position 350 and the subsequent actual position 370 may be represented in multiple images of the hand captured between these two positions by the RGB camera 320. Such movement may also be represented in multiple data sets received by the depth sensing camera 324 between these two positions. Using these images and data sets, the interface program 14 and mixed reality display program 34 may present a realistic video presentation of the user's hand moving between these positions. In one example, a refresh rate of 30 frames per second may be utilized. In other examples, other suitable refresh rates may also be used to provide a realistic video presentation.

Advantageously, such a realistic presentation may induce a user to experience a convincingly immersive and intuitive identification of this virtual hand as an "extension" of his physical body. In some examples, such a convincing experience enables a precise sensory-motor identity remapping with respect to the virtual hand image. Further, it will be appreciated that such an experience is advantageously enhanced by using actual images of the user's hand, including the particular and familiar details of the user's hand such as skin texture, color, fingernail shape and appearance, jewelry worn, and actual finger/hand pose.

Additionally, by utilizing a direct presentation in the displayed virtual environment of an image of the user's hand, the interface system 10 avoids computationally-intensive and time-consuming processes, such as joint reconstruction, that may create additional latencies in the user's interaction experience. Advantageously, by utilizing a direct, realistic presentation of actual hand images in this manner, a perceived low-latency between a user's movement of his hand and the corresponding movement of the displayed hand image may be provided. Alternatively expressed, a user may have an interaction experience in which the user perceives a natural, real-time relationship between actual movements of the user's hand and the corresponding movement of the displayed hand image.

In some examples, a user may perceive zero or substantially zero latency in the interaction experience, since the user's perception of the interaction is not lower-bounded by a frame-rate or processing time of the interface system 10. Rather, in the present system the user's perception of the interaction may be limited only by psychophysical factors related to the extent to which the user identifies the virtual hand as a direct extension of the user's physical body. Further and as explained above, by utilizing a direct, realistic presentation of actual hand images, the interface system 10 enables a user to perceive little or no latency between a user's movement of his hand and the corresponding movement of the displayed hand image. Alternatively expressed, the user's agency or ownership of the virtual hand is improved with the interface system 10.

In some examples, the interface program 14 may also be configured to provide to the display device 312 for display one or more location sensory cues that correspond to a virtual position of a segmented version of the user's hand in the virtual environment. With reference to FIG. 3, in one example a virtual shadow 378 may be generated in the home screen 308 to simulate a shadow cast by the segmented version 80 of user's right hand 334 from a virtual light source. Such a virtual shadow 378 may assist the user 304 in visually tracking the location, and relative distance from the touch interaction plane, of the hand as it moves through the home screen 308.

As illustrated in FIG. 3 and described in more detail below, such a shadow 378 may also provide a sense of depth and assist with interaction experiences between the segmented versions of the user's hand and virtual objects in the home screen 308 and/or physical objects viewed in a mixed reality environment. In one example a location sensory cue, such as shadow 378, may be provided to the display device upon detecting that a virtual position of the user's hand is within a predetermined proximity of a virtual object or a physical object. For example and with reference to FIG. 4, a segmented version 436 of the image of hand 334 may be displayed at a virtual distance $D_3$ from a holographic globe 410 in the virtual environment 38. A predetermined proximity may be defined as a virtual distance less than or equal to $D_3$. Accordingly, upon detecting that the image of hand 334 is located a virtual distance $D_3$ from the holographic globe 410, a location sensory cue may be provided to the display device for display at the globe. It will be appreciated that any suitable predetermined proximity distance, such as 5 cm., 10 cm., or other suitable distance, may be utilized.

In other examples, the interface program 14 may also be configured to visually transform one or more segmented versions of images of the user's right hand 334 according to one or more virtual reality transforms. For example and with reference to the segmented version 90 of the subsequent image of the hand in FIG. 3, this version may be transformed to have a degree of transparency such that a portion of the envelope image 380 beneath this version is visible. Providing a degree of transparency may also assist the user 304 in seeing and manipulating virtual objects and/or interacting with physical objects in a mixed reality environment 48.

In other examples the user's left hand 342 may also be imaged and projected in the manner discussed above. In still other examples, the user's left hand 342 alone may be imaged and projected in the manner discussed above.

Figure 5:
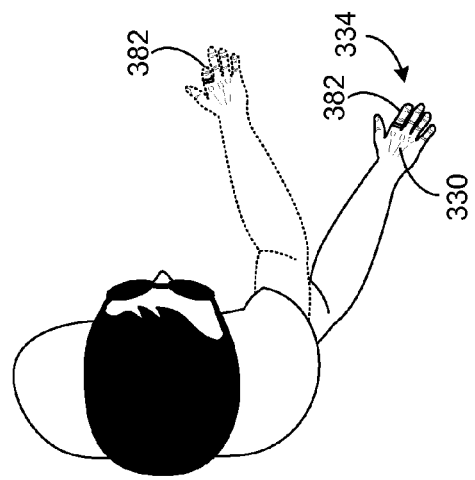
FIG. 5 is schematic top view of the user of FIG. 4.
Figure 4:
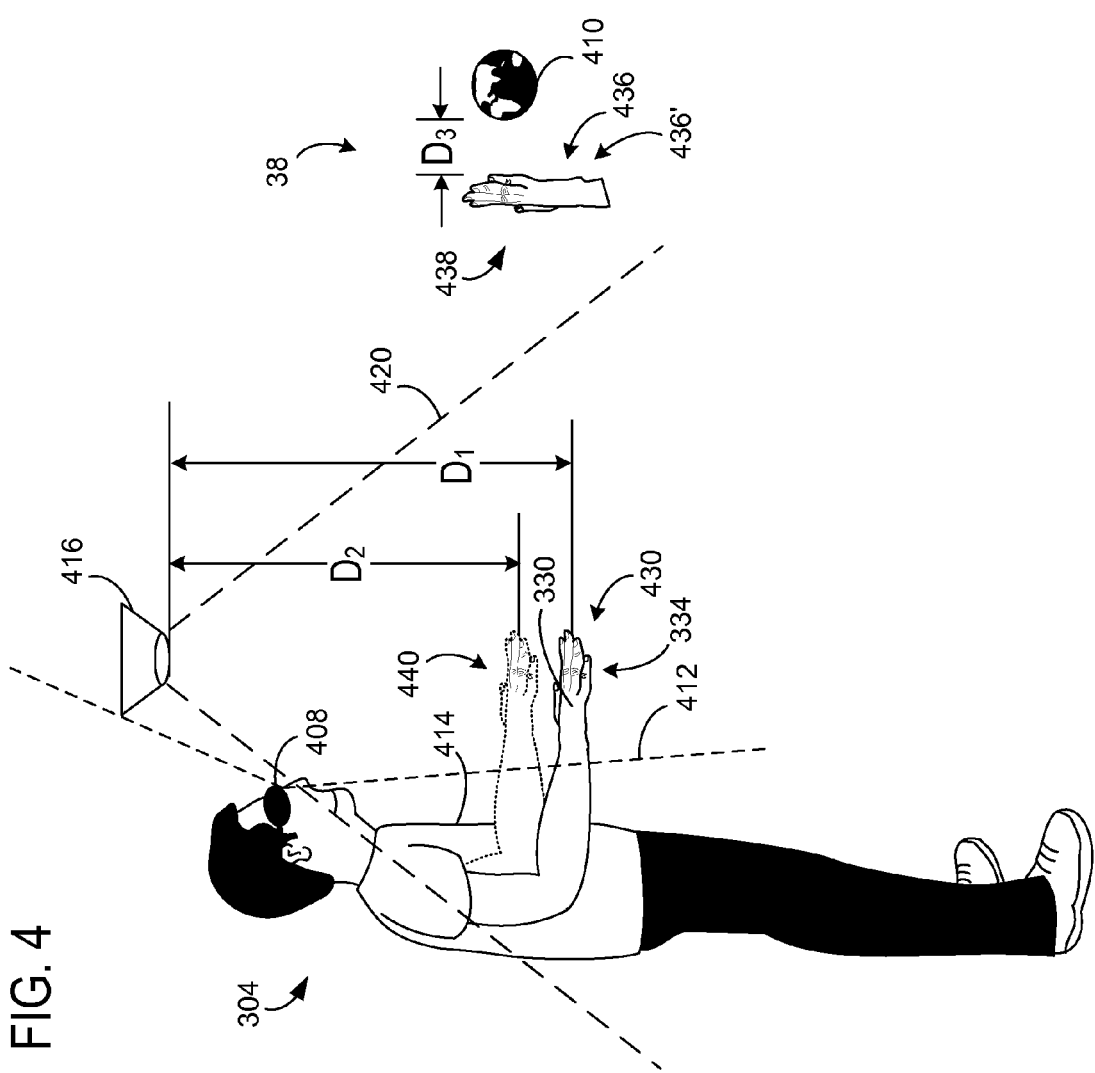
FIG. 4 is a schematic side view of a user wearing a head-mounted display device and interacting with an example virtual environment using the interface system according to an embodiment of the present disclosure.
Figure 6:
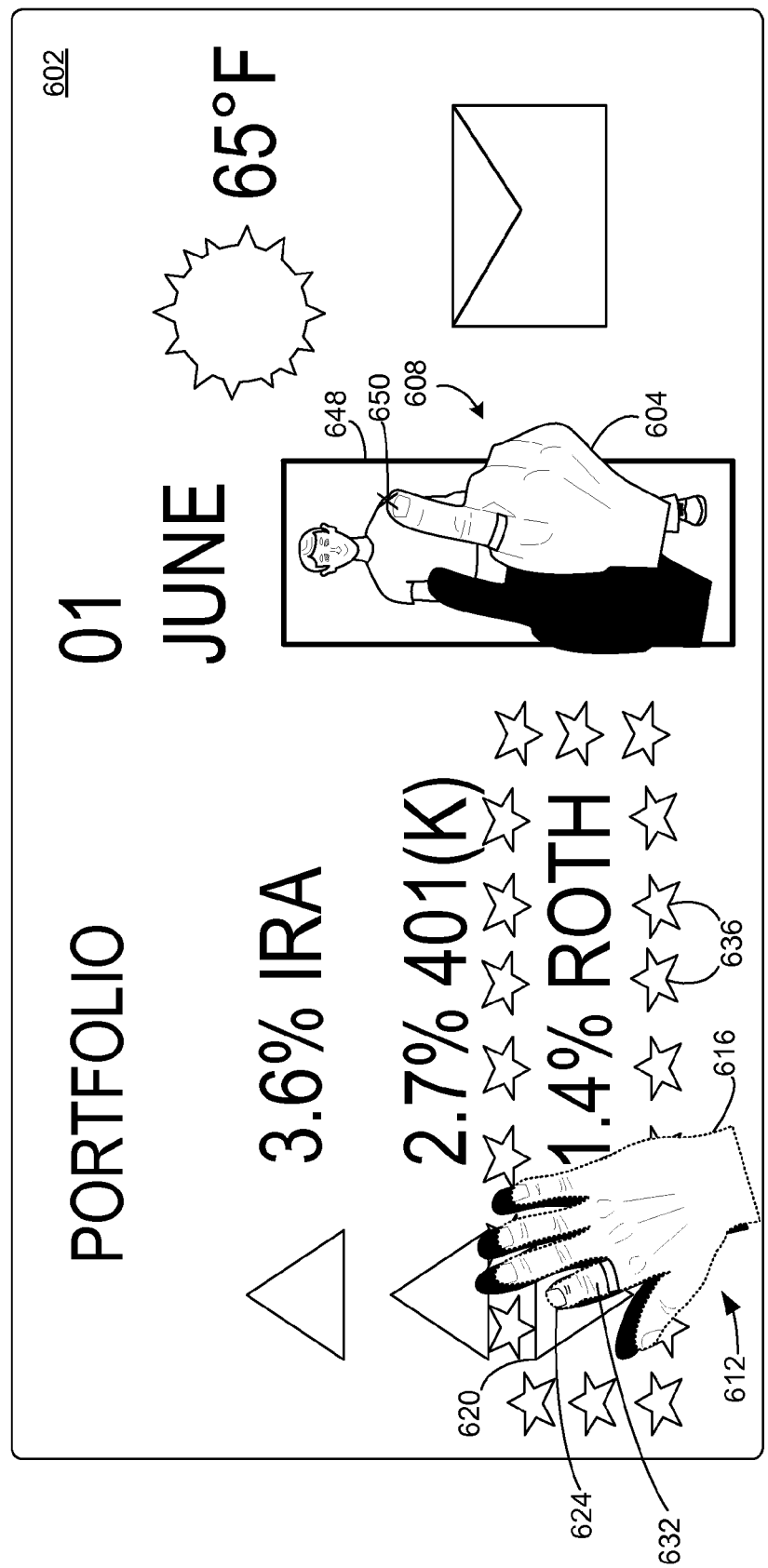
FIG. 6 is a schematic view of two segmented versions of a user's hand generated by the interface system according to an embodiment of the present disclosure.

With reference now to FIGS. 4, 5 and 6, other use case examples of the interface system 10 will now be discussed. FIG. 4 is a schematic view of the user 304 wearing an HMD device 408 in the form of HMD device 46 and glasses 200 as described above. The user 304 is interacting with an example virtual environment 38 that includes a holographic globe 410 and a 3D segmented version 436 of an image of the back 330 of the user's hand 334.

In this example the optical sensor system 66 of the HMD device 46 may include a visible light camera and a depth sensing camera that each has a field of view, such as field of view 412, that captures the back 330 of the user's right hand 334 as it extends in front of the user's torso 414. In other examples, a downwardly facing capture device 416 may be positioned above the user's hand 334 and include a visible light camera and a depth sensing camera that each has a field of view, such as field of view 420, that captures the user's right hand as it extends in front of the user's torso 414.

It will be appreciated that in some examples, depending upon the size of the field of view and the hand location relative to the capture device, scaling, perspective, and/or other imaging corrections may be applied to the captured images of the user's hand in generating segmented versions of the images. It will also be appreciated that a volume of the user's hand 334 may be determined or estimated using one or more of a variety of techniques. In one example, a volume of the hand 334 may be estimated based on a suitable imaging technique, such as using depth camera data to determine one or more thicknesses of the hand. In some examples such data may be collected over time. In other examples, a volume of the hand 334 may be estimated based at least in part on demographic data provided by the user. Other suitable techniques and combinations of techniques for estimating a volume of the hand 334 may also be used.

With continued reference to FIG. 4, a captured image of the back 330 of the hand 334 may be combined with an estimated volume of the hand 334 to generate a 3D representation of the hand. The 3D representation may be projected into the virtual environment 38 to a projected position 438. In one example, a 3D representation may be projected into the same coordinate space of the virtual environment 38 that is utilized to present the holographic globe 410. A segmented version 436 of the projected representation is then provided to the HMD device 408 for display at the projected position 438 in the virtual environment 38.

It will be appreciated that generating the 3D representation of the hand does not affect the displayed hand segmentation, since the segmentation represents the hand's 3D image as seen from the point-of-view of the capture device 416. The displayed hand segmentation also accurately simulates a similar projected (e.g. vertical) hand that would have been seen from the user's eyes point-of-view. Advantageously, this enables minimal computational processing for the segmented hand's presentation. Additionally, the 3D representation of the hand may be used internally for the calculations of collisions, interactions, and general distances between the hand and its surrounding mixed-reality environment 48.

Advantageously, and as explained in more detail below, using the same coordinate space for both the 3D representation of the hand 334 and the holographic globe 410 simplifies collision detection and other virtual environment processes related to manipulating virtual objects and interacting with physical objects in a mixed reality environment. In some examples, this configuration may also enable pixel-by-pixel detection of volumetric collisions. For example, a 3D bounding box or voxel-based representation of the user's hand 334 may be utilized in the coordinate space to detect a collision between such a representation of the hand and a virtual object. Such a configuration may also further enhance the realism and perceived low latency of the interaction experience for the user.

With reference now to an example in which the downwardly facing capture device 416 captures images of the user's right hand 334, in one example the user 304 may move his right hand in a vertical direction, toward and away from the capture device 416. As shown in FIG. 4, an initial actual position 430 of the hand 334 may be spaced from the capture device by an initial actual distance $D_1$. In this initial actual position 430, the segmented version 436 of the image of hand 334 is displayed at a virtual distance $D_3$ from the holographic globe 410 in the virtual environment 38.

At a subsequent actual position 440, the hand 334 may be spaced from the capture device by a subsequent actual distance $D_2$ that is greater than $D_1$. In this subsequent actual position 440, a segmented version 436' of the image of the hand 334 is also displayed at substantially the same virtual distance $D_3$ from the holographic globe 410 in the virtual environment 38. Alternatively expressed, the user 304 perceives the distance $D_3$ to be substantially constant whether the user's hand 334 is in the initial actual position 430 or in the vertically higher subsequent actual position 440.

In one example, this may enable the user 304 to move his hand 334 laterally from side to side, as shown in FIG. 5, to virtually traverse a lateral expanse of the virtual environment 38, while the segmented version of the image of the hand 334 remains a substantially constant distance from a vertical plane in the virtual environment. In this manner and in another example, the user 304 may easily move the segmented version of his hand along a 2D plane of a virtual environment 38, such as the home screen 308 of FIG. 3, while perceiving the image of his hand as staying a relatively constant distance from the 2D plane. Advantageously, this may help minimize the mental stress that can be experienced by the user 304 in continually attempting to avoid inadvertent operations or virtual touches.

As noted above, a user's perception of such distance may be enhanced by utilizing one or more location sensory cues, such as shadows. Further, and as explained in more detail below, the interface system 10 may also detect one or more particular movements or gestures, such as the user extending his index finger 382 downwardly, and may correspondingly represent such movement in the virtual environment 38.

In another example, as the user moves his hand 334 upwardly from the initial actual position 430 to the subsequent actual position 440, the distance $D_3$ may correspondingly increase. In this manner, the user 304 may perceive the segmented version of the image of the hand 334 as correspondingly moving away from the virtual globe 410. In this example, the hand's displayed segmented image size grows when moving away from the globe 410, since the hand moves closer to the capture device 416, which is advantageously consistent with the user's expectations in a realistic hand manipulation.

With reference now to FIG. 6, this figure provides a schematic view of two segmented versions of the user's hand 334 generated by the interface system 10 according to an embodiment of the present disclosure. In FIG. 6 the virtual environment 38 comprises a virtual home screen 602 as viewed by user 304 via HMD device 408.

In one example and as discussed briefly above, the interface program 14 may be configured to detect a collision between a 3D representation of the user's hand 334, such as a bounding box or voxel-based representation, and a virtual object displayed in the home screen 602. As illustrated in FIG. 6, an initial segmented version 604 of an initial image of the hand 334 is provided at an initial virtual position 608. At a subsequent virtual position 612, a subsequent segmented version 616 of a subsequent image of the hand 334 represents the user extending his index finger 382 downwardly to virtually "touch" the triangle icon 620.

Advantageously, in this example the interface program 14 uses only computationally simple bounding box or voxel-based interactions and does not use any semantic (e.g. hand-parts) tracking that would be more computationally expensive. In some examples where no collision or touch events occur, even non-semantic patch-based tracking may not be needed, since a segmented RGB version of the image of the hand is presented "as is", and more detailed tracking of hand parts is not necessary.

Upon detecting the collision between the tip 624 of the virtual index finger 632 and the triangle icon 620, the interface program 14 may provide one or more collision sensory cues to the user 304 via the HMD device 408. As shown in FIG. 6, in one example a sensory collision cue may comprise a visual highlight 636 in the form of stars encircling the triangle icon 620 and adjacent information. In other examples the sensory collision cues may include, but are not limited to, other visual highlights such as flashing and/or changing colors, audio cues, and haptic feedback.

With reference now to FIG. 7, another example use case is provided. FIG. 7 a schematic view of a mixed reality environment 48 in the form of a model showroom 704 in the Store A home store as viewed by user 304 via HMD device 408. A holographic globe 708 representing a symbol of Store A may be visible to the user 304 in the foreground of the model showroom 704. A physical table 712, lamp 716 and chair 720 may be on display in the showroom 704.

A segmented version 730 of an image of the back 330 of the user's hand 334 is provided at an initial virtual position 734 that represents an initial actual position of the user's hand 334. The user 304 may desire to receive more information regarding the table 712. In one example the user may provide user input 88 (see FIG. 1) to the interface program 14 via the HMD device 46 that indicates or otherwise suggests the user's interest in the table 712. Such input may be interpreted by the interface program 14 as relating to a remapped virtual position 738 that corresponds to the location of the table 712 in the mixed reality environment of the virtual showroom 704.

In one example, the user 304 may shift his eyes to gaze at the table 712. An eye-tracking system 62 may detect the user's gaze at the table 712, and provide such user input to the interface program 14. In another example, the user may indicate his interest in the table 712 via spoken words, such as, "That's a cool table." The microphone system 72 may receive such audio user input and a speech recognition system may interpret the audio received. It will be appreciated that many other forms and types of user input via the HMD device 46 or other user input device may be used and are within the scope of this disclosure.

Based on the user input 88, the interface program 14 may project an image of the back 330 of the user's hand 334 into the mixed reality environment to the remapped virtual position 738. A segmented version 740 of the projected image may then be provided to the HMD device 46 for display at the remapped virtual position 738 at the physical table 712. A segmented version 740 of the image may then be displayed at the remapped virtual position 738. Advantageously, in this example the interface system 10 enables a natural, quick repositioning of an image of the user's hand 334 within a mixed reality environment via user input. In some examples, such repositioning may be performed while the user keeps his hand 334 substantially stationary. In these examples and as illustrated in FIG. 7, the two segmented versions 730 and 740 may represent the same posture or positioning of the hand 334.

Also as shown in the example of FIG. 7, the segmented version 740 of the image at the remapped virtual position 738 is scaled smaller than the segmented version 730 of the image at the initial virtual position 734. In this manner, a perception of the segmented version 740 at the remapped virtual position 738 being farther away from the user than the segmented version 730 at the initial virtual position 734 may be enhanced.

In another example, the interface program 14 may detect a collision between a 3D representation of the user's hand 334 and the physical table 712. With continued reference to FIG. 7, when the segmented version 740 of the hand 334 is positioned at the table 712, the user may "select" the table to receive additional information regarding the table by extending his index finger 382 downwardly to virtually "touch" the physical table. Once the interface program 14 detects a collision between the 3D representation of the user's hand 334, in this case the user's index finger 382, and the physical table 712, the program may provide additional information to the user regarding the table.

In one example, a virtual information bubble 750 may be displayed above the table containing additional information, such as model, price and availability of the table. It will also be appreciated that detection of such a "selection" of a physical object may trigger various other responses and/or actions via the interface program 14. Such responses and/or actions may include, but are not limited to, saving information and/or images of the table 712 to a list, generating an enlarged image of the table 712, etc.

With reference now to FIG. 6, in another example the interface program 14 may provide a virtual object to the HMD device 46 of the user 304 for display at a virtual focal point. For example, the interface program 14 may provide the virtual photograph 648 to the HMD device 46 for display at a virtual focal point 650 within the virtual environment represented as the home screen 602. The initial segmented version 604 of the initial image of the hand 334 is also provided for display at the virtual focal point 650. Advantageously, in this manner the user 304 may have a single focal point 650 at which to view both the virtual photograph 648 and the initial segmented version 604 of the image of the hand 334. This may further enhance the user's perception of realism when interacting with the home screen 308.

It will be appreciated that the interface system 10 enables a user to attend and focus her attention on an image of the user's hand and its projected location, as opposed to the user's actual, physical hand. In some examples this enables the user to keep her hand generally relaxed and comfortably hanging downwardly by her side. Accordingly, the physical hand may be out of the user's sight, such as below the user's eyes' field of view.

Advantageously, enabling such positioning of the user's hand out of sight further increases the user's feelings of ownership and agency towards the virtual hand image. This accordingly provides an improved, low or zero latency interaction experience by virtue of the user attending to and visually focusing on the virtual hand image as opposed to the user's actual hand. Advantageously, the interface system 10 thereby facilitates the user in perceiving and experiencing the onset time of movements of the virtual hand image as naturally corresponding to the self-initiated movements of the user's actual hand.

Additionally, in some examples the user's hand may be presented as a virtual palm segmentation without a surrounding visual context (e.g. fading-out towards the wrist). The motion mapping of movements of the virtual palm segmentation may be modified to create illusory haptic feedback (or "pseudo haptic" feedback), and thereby further enhance the immersive experience of the user. Such motion-mapping modifications may include, but are not limited to, speed changes to simulate friction or slope, sudden motion stop to simulate reaction to seen obstacles, and trajectory changes to simulate a scene's trajectory constraints (e.g. bumps) or physical effects (e.g. a magnetic field).

In some examples, the interface system 10 may synchronize tactile feedback with a displayed touch or collision event by remapping the position of virtual objects with respect to actual physical objects surrounding the physical hand and touched by it. This remapping may also include motion remapping of the hand's image (e.g. speed changes) in order to match distances, such as virtual hand to virtual objects distances and physical hand to physical objects distances.

In some examples, the interface system 10 may provide enhanced interactions and corresponding sensory cues with 3D images and/or 3D video. The interface system 10 may display such images and/or video and use depth information to generate appropriate sensory depth cues. In one example, the system may present a 3D photo or video previously captured by the HMD display 46, and display the virtual hand as hovering adjacent to or touching the photo or video. The system may provide sensory cues (such as a relative shadow) based on the hand's projected position with respect to each voxel of the photo or video (e.g., each of the 2D RGB values with their respective depth information). In this manner, the interface system 10 may enable a user to experience the photo or video as more realistically 3-dimensional. Further, this configuration may enable a user to touch or otherwise interact individually with the separate elements or parts within the photo/video.

It will also be appreciated that the interface system 10 may enable a user to virtually interact with physical objects that are out-of-reach (remote), untouchable (e.g. very hot, as when pointing and getting tooltip information on a car's internal engine parts), rigid or opaque (e.g. virtually penetrating walls), etc.

Figure 8C:
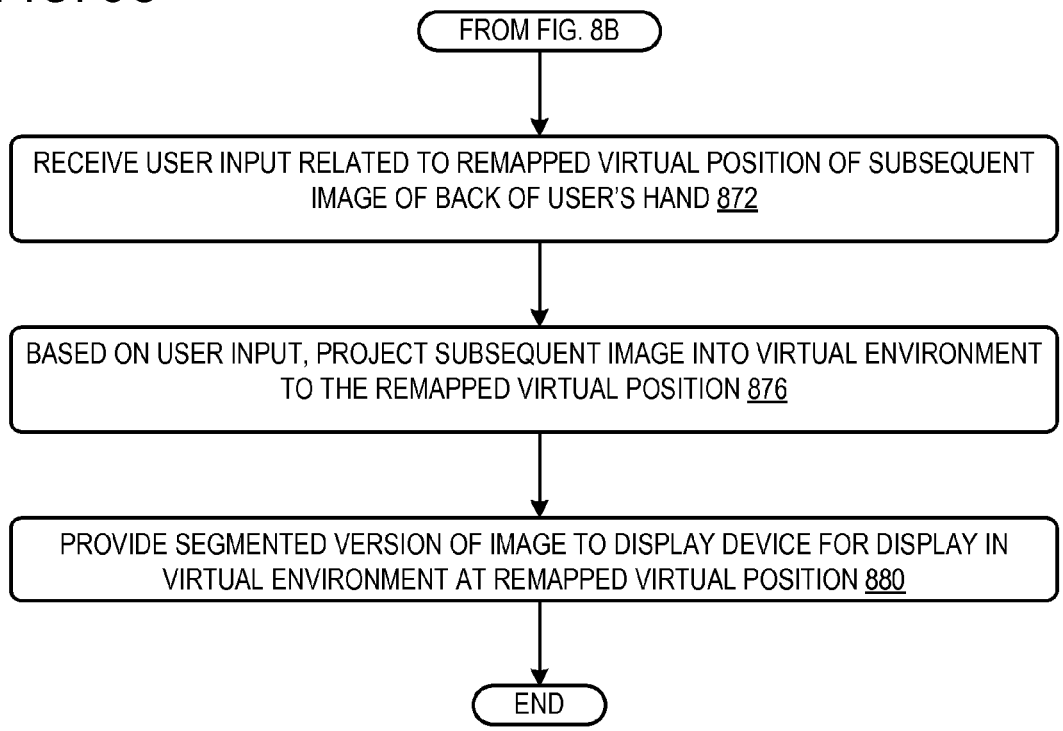

FIGS. 8A and 8B illustrate a flow chart of a method 800 for providing a low-latency interaction in a virtual environment according to an embodiment of the present disclosure. The following description of method 800 is provided with reference to the software and hardware components of the interface system 10 described above and shown in FIGS. 1-7. It will be appreciated that method 800 may also be performed in other contexts using other suitable hardware and software components.

With reference to FIG. 8A, at 804 the method 800 includes receiving an initial image of a back of a user's hand and corresponding initial depth information that represent an initial actual position of the hand. At 808 the method 800 includes receiving the initial image of the back of the user's hand from a capture device having a field of view that captures the back of the user's hand. At 812 the initial actual position is spaced from the capture device by an initial actual distance.

At 816 the method 800 includes, using the initial depth information, projecting the initial image into the virtual environment to an initial virtual position, where the initial virtual position corresponds to the initial actual position. At 820 the initial virtual position is spaced from a virtual object in the virtual environment by a virtual distance. At 822 the method 800 includes providing a segmented version of the initial image to a display device for display in the virtual environment at the initial virtual position.

At 824 the method includes receiving a subsequent image of the back of the user's hand and corresponding subsequent depth information that represent a subsequent actual position of the hand that is different from the initial actual position. At 828 the method 800 includes receiving the subsequent image of the back of the user's hand from a capture device having a field of view that captures the back of the user's hand. At 832 the subsequent actual position is spaced from the capture device by a subsequent actual distance that is different from the initial actual distance.

At 834 the method 800 includes, using the subsequent depth information, projecting the subsequent image into the virtual environment to a subsequent virtual position, where the subsequent virtual position corresponds to the subsequent actual position. At 838 the subsequent virtual position is spaced from the virtual object by substantially the same virtual distance as the initial virtual position. At 842 the method 800 includes providing a segmented version of the subsequent image to the display device for display in the virtual environment at the subsequent virtual position.

At 844 the method 800 includes, regardless of the initial actual position and the subsequent actual position of the user's hand, providing the segmented version of the initial image and the segmented version of the subsequent image of the hand to the display device for display at a virtual orientation in which the hand extends generally upwardly in the virtual environment. At 848 the method 800 includes detecting a collision between a three-dimensional representation of the hand and the virtual object or a physical object. At 850 the method 800 includes, upon detecting the collision, providing a collision sensory cue to the display device for display.

At 858 the method 800 includes providing the virtual object to the display device for display at a virtual focal point. At 860 the method 800 includes providing the segmented version of the subsequent image to the display device for display at the virtual focal point. At 864 the method 800 includes providing to the display device for display a location sensory cue that corresponds to a virtual position of the user's hand in the virtual environment. At 866 the method 800 includes providing to the display device a location sensory cue upon detecting that the virtual position of the user's hand is within a predetermined proximity of a virtual object or a physical object.

At 868 the method 800 includes visually transforming the segmented version of the initial image and/or the segmented version of the subsequent image of the back of the user's hand according to one or more virtual reality transforms. At 872 the method 800 includes receiving user input related to a remapped virtual position of an image of the back of the user's hand. At 876 the method 800 includes, based on the user input, projecting the image into the virtual environment to the remapped virtual position. At 880 the method 800 includes providing a segmented version of the image to the display device for display in the virtual environment at the remapped virtual position.

It will be appreciated that method 800 is provided by way of example and is not meant to be limiting. Therefore, it is to be understood that method 800 may include additional and/or alternative steps than those illustrated in FIGS. 8A, 8B and 8C. Further, it is to be understood that method 800 may be performed in any suitable order. Further still, it is to be understood that one or more steps may be omitted from method 800 without departing from the scope of this disclosure.

Figure 9:
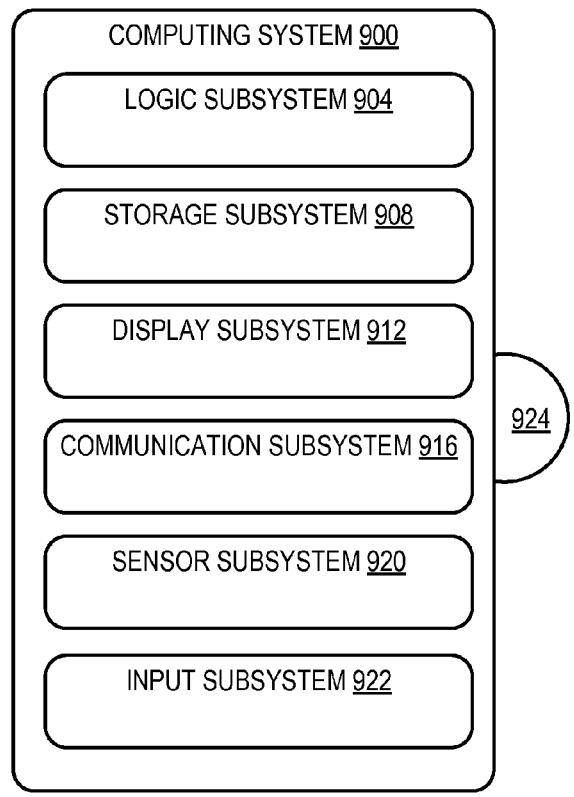
FIG. 9 is a simplified schematic illustration of an embodiment of a computing system.

FIG. 9 schematically shows a nonlimiting embodiment of a computing system 900 that may perform one or more of the above described methods and processes. Computing device 22 may take the form of computing system 900. Computing system 900 is shown in simplified form. It is to be understood that virtually any computer architecture may be used without departing from the scope of this disclosure. In different embodiments, computing system 900 may take the form of a mainframe computer, server computer, desktop computer, laptop computer, tablet computer, home entertainment computer, network computing device, mobile computing device, mobile communication device, gaming device, etc. As noted above, in some examples the computing system 900 may be integrated into an HMD device.

As shown in FIG. 9, computing system 900 includes a logic subsystem 904 and a storage subsystem 908. Computing system 900 may optionally include a display subsystem 912, a communication subsystem 916, a sensor subsystem 920, an input subsystem 922 and/or other subsystems and components not shown in FIG. 9. Computing system 900 may also include computer readable media, with the computer readable media including computer readable storage media and computer readable communication media. Computing system 900 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 904 may include one or more physical devices configured to execute one or more instructions. For example, the logic subsystem 904 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 904 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 908 may include one or more physical, persistent devices configured to hold data and/or instructions executable by the logic subsystem 904 to implement the herein described methods and processes. When such methods and processes are implemented, the state of storage subsystem 908 may be transformed (e.g., to hold different data).

Storage subsystem 908 may include removable media and/or built-in devices. Storage subsystem 908 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 908 may include devices with one or more of the following characteristics: volatile, nonvolatile, dynamic, static, read/write, read-only, random access, sequential access, location addressable, file addressable, and content addressable.

In some embodiments, aspects of logic subsystem 904 and storage subsystem 908 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 9 also shows an aspect of the storage subsystem 908 in the form of removable computer readable storage media 924, which may be used to store data and/or instructions executable to implement the methods and processes described herein. Removable computer-readable storage media 924 may take the form of CDs, DVDs, HD-DVDs, Blu-Ray Discs, EEPROMs, and/or floppy disks, among others.

It is to be appreciated that storage subsystem 908 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 912 may be used to present a visual representation of data held by storage subsystem 908. As the above described methods and processes change the data held by the storage subsystem 908, and thus transform the state of the storage subsystem, the state of the display subsystem 912 may likewise be transformed to visually represent changes in the underlying data. The display subsystem 912 may include one or more display devices utilizing virtually any type of technology. Such display devices may be combined with logic subsystem 904 and/or storage subsystem 908 in a shared enclosure, or such display devices may be peripheral display devices. The display subsystem 912 may include, for example, the display system 54 and transparent display 58 of the HMD device 46.

When included, communication subsystem 916 may be configured to communicatively couple computing system 900 with one or more networks and/or one or more other computing devices. Communication subsystem 916 may include wired and/or wireless communication devices compatible with one or more different communication protocols. As nonlimiting examples, the communication subsystem 916 may be configured for communication via a wireless telephone network, a wireless local area network, a wired local area network, a wireless wide area network, a wired wide area network, etc. In some embodiments, the communication subsystem may allow computing system 900 to send and/or receive messages to and/or from other devices via a network such as the Internet.

Sensor subsystem 920 may include one or more sensors configured to sense different physical phenomenon (e.g., visible light, infrared light, sound, acceleration, orientation, position, etc.) as described above. Sensor subsystem 920 may be configured to provide sensor data to logic subsystem 904, for example. As described above, such data may include eye-tracking information, image information, audio information, ambient lighting information, depth information, position information, motion information, user location information, and/or any other suitable sensor data that may be used to perform the methods and processes described above.

When included, input subsystem 922 may comprise or interface with one or more sensors or user-input devices such as a game controller, gesture input detection device, voice recognizer, inertial measurement unit, keyboard, mouse, or touch screen. In some embodiments, the input subsystem 922 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the interface system 10 that is implemented to perform one or more particular functions. In some cases, such a program may be instantiated via logic subsystem 904 executing instructions held by storage subsystem 908. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interface system for providing a low-latency interaction in a virtual environment, the interface system comprising:
   an interface program executed by a processor of a computing device, the interface program configured to:
      receive an initial actual image of a back of a user's hand from a capture device having a field of view that captures the back of the user's hand, and corresponding initial depth information that represent an initial actual position of the hand, the initial actual position being spaced from the capture device by an initial actual distance;
      using the initial depth information, project the initial actual image into the virtual environment to an initial virtual position, the initial virtual position corresponding to the initial actual position and spaced from a virtual object or a physical object by a virtual distance;
      provide a segmented version of the initial actual image to a display device for display in the virtual environment at the initial virtual position by partitioning the initial actual image into a plurality of segments, each comprising a respective set of pixels of the initial actual image, the segmented version being one of the plurality of segments and including pixels representing the back of the user's hand;
      receive a subsequent actual image of the back of the user's hand and corresponding subsequent depth information that represent a subsequent actual position of the hand that is different from the initial actual position, the subsequent actual position being spaced from the capture device by a subsequent actual distance different from the initial actual distance;
      using the subsequent depth information, project the subsequent actual image into the virtual environment to a subsequent virtual position, the subsequent virtual position being spaced from the virtual object or the physical object by the virtual distance;
      provide a segmented version of the subsequent actual image to the display device for display in the virtual environment at the subsequent virtual position, by partitioning the subsequent actual image into a plurality of segments, each comprising a respective set of pixels of the subsequent image, the segmented version of the subsequent actual image being one of the plurality of segments and including pixels representing the back of the user's hand; and
      detect a collision between a three-dimensional representation of the hand and the virtual object in the virtual environment or the physical object.

2. The interface system of claim 1, wherein regardless of the initial actual position and the subsequent actual position of the user's hand, the interface program is configured to provide the segmented version of the initial actual image and the segmented version of the subsequent actual image to the display device for display at a virtual orientation in which the hand extends generally upwardly in the virtual environment.

3. The interface system of claim 1, wherein the capture device is located on a head-mounted display device.

4. The interface system of claim 1, wherein the interface program is further configured to:
   provide the virtual object to the display device for display at a virtual focal point; and
   provide the segmented version of the subsequent actual image to the display device for display at the virtual focal point.

5. The interface system of claim 1, wherein upon detecting the collision, the interface program is further configured to provide a collision sensory cue to the display device.

6. The interface system of claim 1, wherein the interface program is further configured to provide to the display device a location sensory cue that corresponds to a virtual position of the user's hand in the virtual environment.

7. The interface system of claim 1, wherein the interface program is further configured to:
   receive user input related to a remapped virtual position of the subsequent actual image of the back of the user's hand;
   based on the user input, project the subsequent actual image into the virtual environment to the remapped virtual position; and
   provide the segmented version of the subsequent actual image to the display device for display in the virtual environment at the remapped virtual position.

8. A method executed on a processor for providing a low-latency interaction in a virtual environment, the method comprising:
   receiving an initial actual image of a back of a user's hand from a capture device having a field of view that captures the back of the user's hand and corresponding initial depth information that represent an initial actual position of the hand, the initial actual position being spaced from the capture device by an initial actual distance;
   using the initial depth information, projecting the initial actual image into the virtual environment to an initial virtual position, the initial virtual position corresponding to the initial actual position and spaced from a virtual object or a physical object by a virtual distance;
   providing a segmented version of the initial actual image to a display device for display in the virtual environment at the initial virtual position by partitioning the initial actual image into a plurality of segments, each comprising a respective set of pixels of the initial actual image, the segmented version being one of the plurality of segments and including pixels representing the back of the user's hand;
   receiving a subsequent actual image of the back of the user's hand and corresponding subsequent depth information that represent a subsequent actual position of the hand that is different from the initial actual position, the subsequent actual position being spaced from the capture device by a subsequent actual distance different from the initial actual distance;

using the subsequent depth information, projecting the subsequent actual image into the virtual environment to a subsequent virtual position, the subsequent virtual position being spaced from the virtual object or the physical object by the virtual distance;

providing a segmented version of the subsequent actual image to the display device for display in the virtual environment at the subsequent virtual position, by partitioning the subsequent actual image into a plurality of segments, each comprising a respective set of pixels of the subsequent image, the segmented version of the subsequent actual image being one of the plurality of segments and including pixels representing the back of the user's hand; and detecting a collision between a three-dimensional representation of the hand and the virtual object in the virtual environment or the physical object.

9. The method of claim 8, further comprising providing the segmented version of the initial image and the segmented version of the subsequent image of the hand to the display device for display at a virtual orientation in which the hand extends generally upwardly in the virtual environment, and regardless of the initial actual position and the subsequent actual position of the user's hand.

10. The method of claim 8, further comprising:
providing the virtual object to the display device for display at a virtual focal point; and
providing the segmented version of the initial image and the segmented version of the subsequent image to the display device for display at the virtual focal point.

11. The method of claim 8, further comprising, upon detecting the collision, providing a collision sensory cue to the display device.

12. The method of claim 8, further comprising providing to the display device a location sensory cue that corresponds to a virtual position of the user's hand in the virtual environment.

13. The method of claim 8, further comprising providing to the display device a location sensory cue upon detecting that a virtual position of the user's hand is within a predetermined proximity of the virtual object or the physical object.

14. The method of claim 8, further comprising:
receiving user input related to a remapped virtual position of the subsequent actual image of the back of the user's hand;
based on the user input, projecting the subsequent actual image into the virtual environment to the remapped virtual position; and
providing the segmented version of the subsequent actual image to the display device for display in the virtual environment at the remapped virtual position.

15. The method of claim 8, further comprising visually transforming the segmented version of the initial actual image and/or the segmented version of the subsequent actual image of the back of the user's hand according to one or more virtual reality transforms.

16. A method executed on a processor for providing a low-latency interaction in a virtual environment, the method comprising:

receiving from a capture device an initial actual image of a back of a user's hand and corresponding initial depth information that represent an initial actual position of the hand, the initial actual position being spaced from the capture device by an initial actual distance;

using the initial depth information, projecting the initial actual image into the virtual environment to an initial virtual position, the initial virtual position corresponding to the initial actual position and spaced from a virtual object or a physical object by a virtual distance;

providing a segmented version of the initial actual image to a display device for display in the virtual environment at the initial virtual position by partitioning the initial actual image into a plurality of segments, each comprising a respective set of pixels of the initial actual image, the segmented version being one of the plurality of segments and including pixels representing the back of the user's hand, and, regardless of the initial actual position of the user's hand, at a virtual orientation in which the hand extends generally upwardly in the virtual environment;

receiving from the capture device a subsequent actual image of the back of the user's hand and corresponding subsequent depth information that represent a subsequent actual position of the hand that is different from the initial actual position, the subsequent actual position being spaced from the capture device by a subsequent actual distance different from the initial actual distance;

using the subsequent depth information, projecting the subsequent actual image into the virtual environment to a subsequent virtual position, the subsequent virtual position being spaced from the virtual object or the physical object by the virtual distance;

providing a segmented version of the subsequent actual image to the display device for display in the virtual environment at the subsequent virtual position, by partitioning the subsequent actual image into a plurality of segments, each comprising a respective set of pixels of the subsequent actual image, the segmented version of the subsequent actual image being one of the plurality of segments and including pixels representing the back of the user's hand, and, regardless of the subsequent actual position of the user's hand, at the virtual orientation in which the hand extends generally upwardly in the virtual environment; and detecting a collision between a three-dimensional representation of the hand and the virtual object in the virtual environment or the physical object.

* * * * *